Feb. 22, 1927. 1,618,448
A. J. LA GASA
ROTARY INTERNAL COMBUSTION ENGINE
Filed Aug. 27, 1924   4 Sheets-Sheet 1
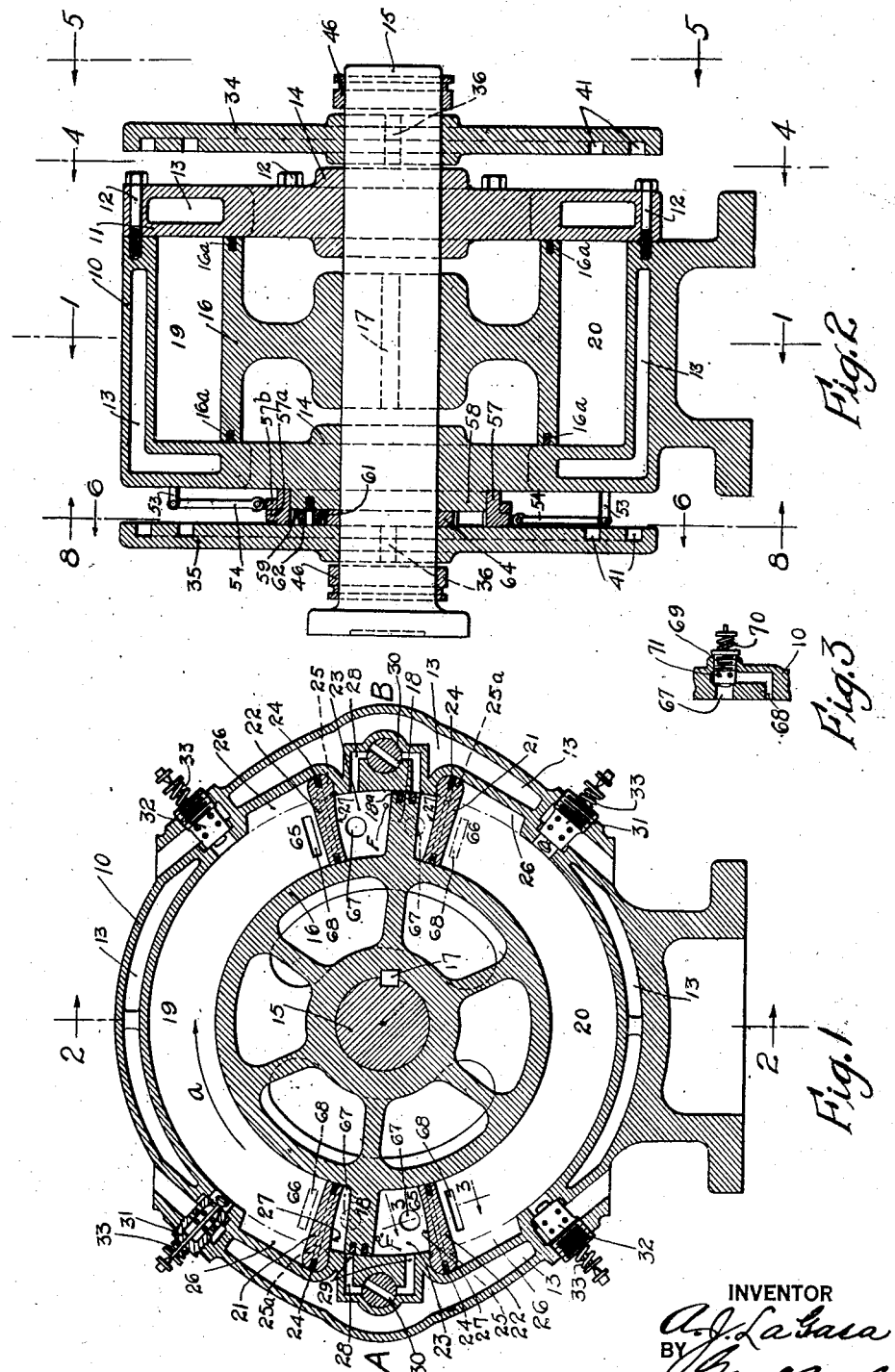
INVENTOR
A. J. La Gasa
BY
ATTORNEY

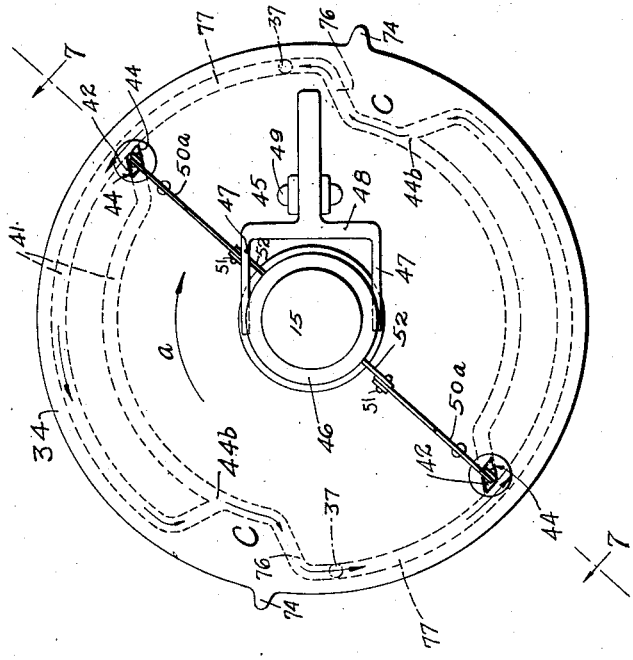
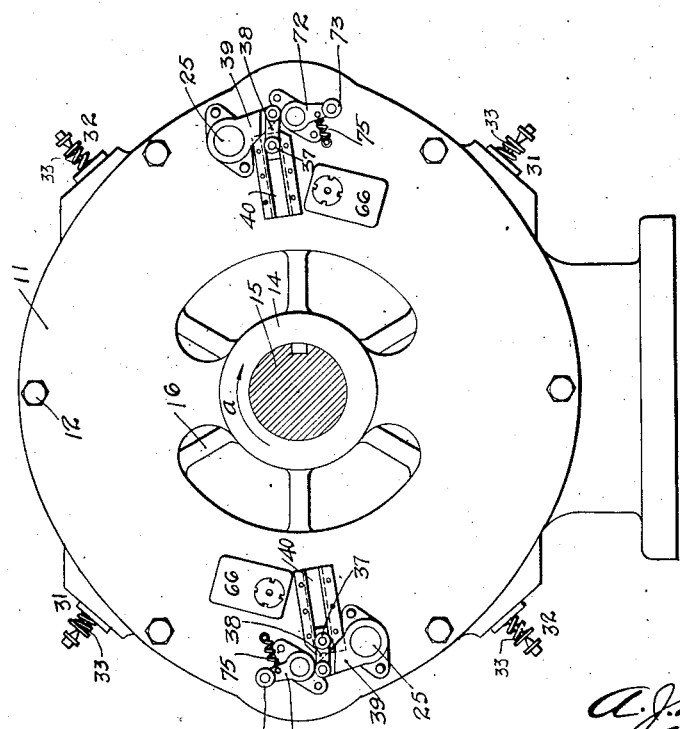

Feb. 22, 1927. 1,618,448
A. J. LA GASA
ROTARY INTERNAL COMBUSTION ENGINE
Filed Aug. 27, 1924 4 Sheets-Sheet 3
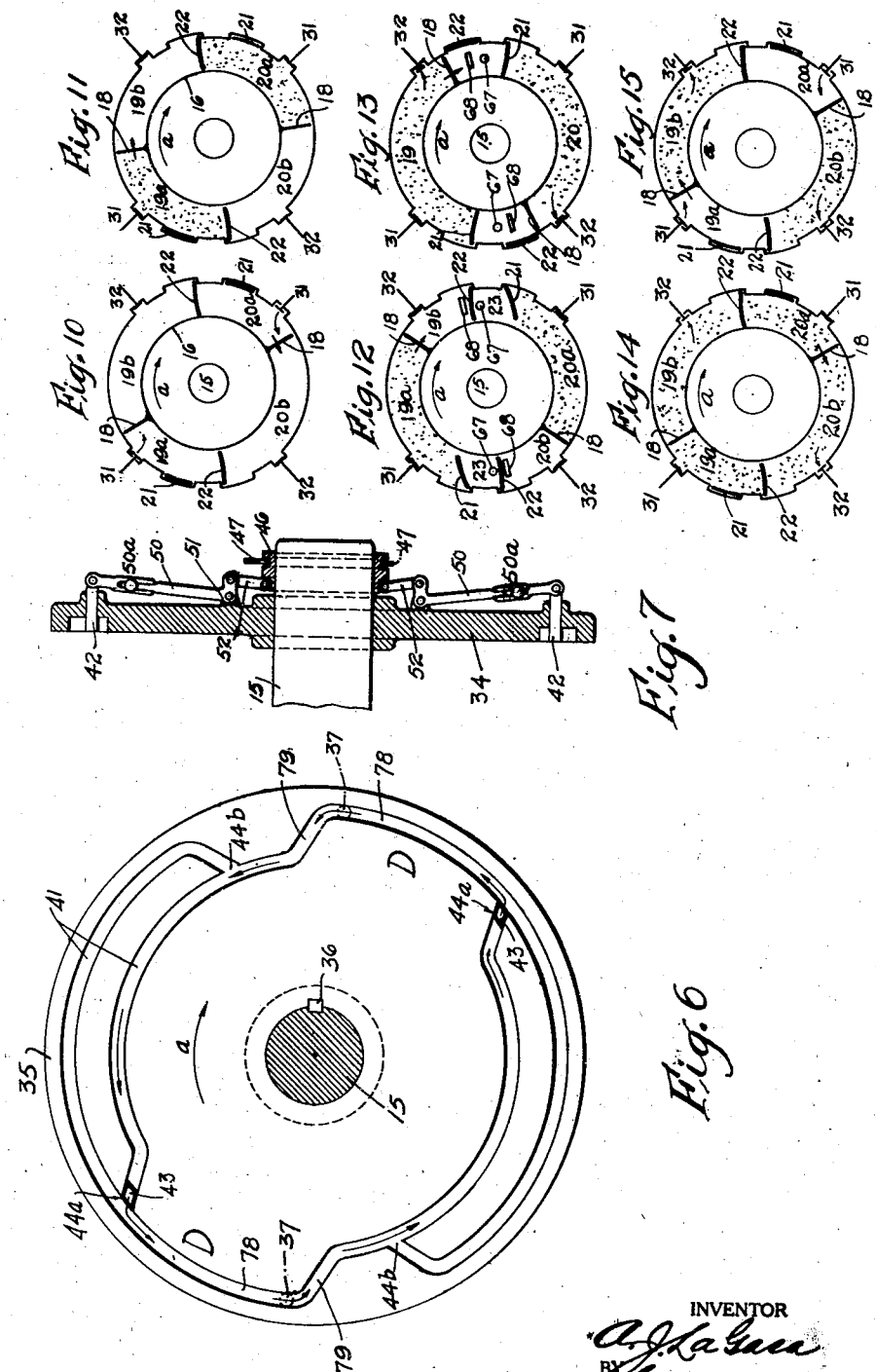

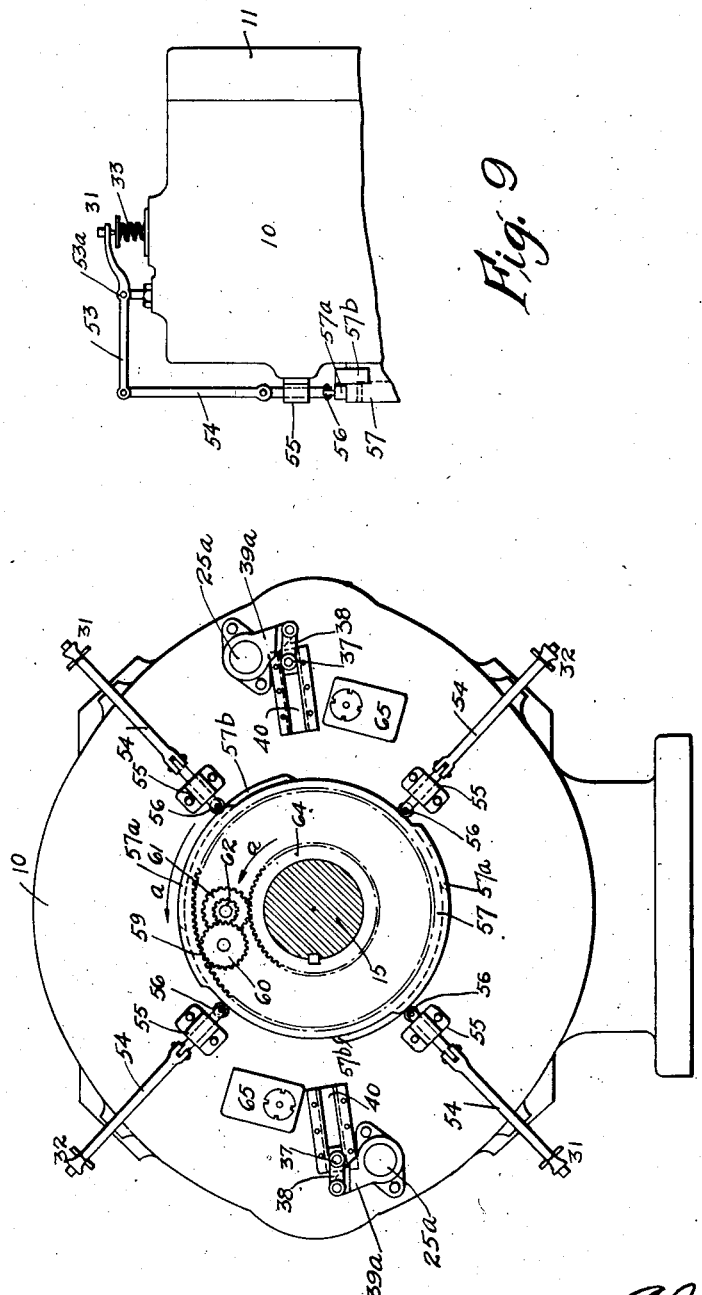

Patented Feb. 22, 1927.

1,618,448

UNITED STATES PATENT OFFICE.

ARTHUR JAMES LA GASA, OF THE UNITED STATES NAVY.

ROTARY INTERNAL-COMBUSTION ENGINE.

Application filed August 27, 1924. Serial No. 734,376.

This invention relates to prime movers and more particularly to rotary engines adapted to burn a fluid to generate power.

Among the objects of this invention is to provide a rotary engine which is reversible and which embodies a new and improved arrangement and relation of the combustion and compression chambers.

Another object of this invention is to provide a rotary engine which permits of the duplication of the combustion zones for the use of any predetermined number thereof.

Another object of this invention is to provide a rotary engine having novel compression by-pass means for the transfer of the fluid from a compression to a combustion zone.

Another object of this invention is to provide a rotary engine having compression, combustion, and expansion chambers communicating with each other so as to permit the passage successively of a piston or blade therethrough, and means between said chambers adapted to separate one from another to permit the proper and timely functioning of said chambers and to move out of the path of said piston to permit the passage thereof.

Still another object of this invention is to provide a rotary engine having a passageway or the like through which a piston or blade is arranged to pass, said passageway being divided into a plurality of chambers by an abutment or gate adapted to swing out of the path of said piston and into a wall of said engine to permit a substantially fluid tight passage of said piston.

Still another object of this invention is to provide a novel arrangement of a compression or precompression chamber and a directly communicating combustion chamber, and by-pass means to permit of flow of the compressed fluid into said combustion chamber before direct communication between said chambers has been established.

Still another object of this invention is to provide a rotary engine having a chamber within which a piston or the like is arranged to advance to compress a fluid, means within said chamber adapted to close behind said piston after the same has reached a predetermined point in said chamber, and means to by-pass the compressed fluid behind the advancing piston for subsequent firing and actuation of said piston.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a sectional elevation of the engine taken on the line 1—1 of Fig. 2.

Fig. 2 is a sectional elevation taken on the line 2—2 of Fig. 1 with certain parts omitted.

Fig. 3 is a sectional view of by-pass means taken on the line 3—3 of Fig. 1.

Fig. 4 is an end elevation of the engine body as seen on the line 4—4 of Fig. 2.

Fig. 5 is a view of a cam mechanism as seen on the line 5—5 of Fig. 2.

Fig. 6 is a view of a cam taken on the line 6—6 of Fig. 2.

Fig. 7 is a section taken on the line 7—7 of Fig. 5.

Fig. 8 is an end elevation of the engine as seen on the line 8—8 of Fig. 2.

Fig. 9 is a view showing details of certain valve actuating mechanism shown in Fig. 8.

Figs. 10 to 15 show steps or points of a complete cycle of the engine.

Referring now more specifically to the drawings, the casing or stator of the engine is shown constructed in any suitable manner and comprising preferably a cylindrical body 10 and a co-operating body or end casing 11 fitted and secured thereto as by bolts 12, said bodies having water jackets 13 surrounding the cylindrical space within the stator. Hubs 14 are formed upon the bodies in alinement with each other and coaxial with the cylinder of the engine to permit a shaft 15 or the like to be suitably journaled for supporting a rotor 16 keyed to the shaft at 17 for rotation within the cylinder. The rotor 16 is constructed in any suitable manner and comprises one or more blades or pistons 18, the precise number being determined as set forth hereinafter, said pistons being spaced from each other along the periphery of the rotor and extending across the annular space between the rotor and the cylinder walls. A suitable packing in the form of steel rings or the like is provided at 16ª between the rotor and the end walls of the cylinder, and at 18ᵃ between the pistons and the side walls of the cylinder. The pistons may be of any suitable form, the arrangement disclosed herein embodying a radial type of piston or blade. It will be noted that the two pistons disclosed herein will serve to divide the annular space between the rotor and the walls of the engine into as many separate and substantially fluid tight chambers or compartments 19 and 20.

At a point or points between said chambers, moving closure means or abutments are provided which co-operate in a unique manner with said chambers and with one or more of said pistons. As shown a plurality of said abutments or gates are used to act in co-operation with each other whereby in effect a third type of compartment or chamber is provided between the chambers aforesaid, within which combustion of the fuel occurs, said firing chamber being provided with suitable ignition means F to fire the fuel, which devices, being conventional, have been omitted from the drawings. More particularly abutments or closure means 21 and 22 are provided to extend across said annular space and in proper time to move out of the path of a piston or to close behind the same. These abutments are located at any convenient point within said annular space and are arranged to be adapted to extend entirely across said space to effectively partition off a third type of chamber or enclosure 23 as aforesaid. Suitable packing in the form of steel packing rings or the like is provided along the edges of the abutments as shown at 24 to ensure substantial fluid tightness of the chamber 23. These abutments in operated or closed position are disposed approximately radially of the rotor, the precise position being arranged as desired. The abutments are movably mounted as for oscillation at 25 and 25ᵃ so as to swing or move out of the path of a piston, recesses 26 or the like being provided within a desired part of the engine, into which the abutments may move or swing. As shown in the drawings, the recesses may be located within the walls of the stator, so that when the abutments swing thereinto, they will close or fill said recess to present a piston space or chamber of uniform section for insuring the continuous fluid tightness of the piston as aforesaid. To effectively secure this purpose, the abutments are curved or concaved at a surface 27 thereof to coincide with the internal surface of the cylinder when said abutments are swung into the recesses, the radius of curvature of said surfaces of the abutments being substantially equal to the radius of the cylinder. The abutments are so arranged as to cause the portions thereof which contact the rotor to swing about the points 25 and 25ᵃ in opposite directions relatively to each other when moving into operative or contacting position with the rotor. The abutments can be timed to swing in any desired order or manner being operated independently of each other as will be disclosed hereinafter.

By-pass means which communicate with the ends of the chamber 23 adjacent to the abutments are arranged in any suitable manner to effectuate the objects of this invention. These by-pass means may be rendered operative or closed in any suitable manner. The ports 29 of the by-pass as shown are adapted to be closed momentarily by the outer edge of a piston as it sweeps along each in turn, thereby effecting a closure of the by-pass. A valve 30 can be used to insure accurate operation of the by-pass and to permit of flexibility in the design of the engine. It will be noted that the arrangement of the abutments and the by-pass means is preferably alike for any duplicate combustion chambers 23 that may be used. Thus the mechanism at B is like that at A, said mechanisms being symmetrically located about the axis of the engine, and about a diameter thereof. I do not desire to be limited to the construction of the by-pass means suggested herein, but contemplate a general means or structure whether arranged upon the firing chamber or upon the piston, and timed so as to permit a fluid to flow rearwardly of the advancing piston.

Valves 31 and 32 are arranged within the wall of the stator in spaced relation to the chamber 23 and located in relatively close proximity thereto, and at a distance therefrom determined by the width of the abutments. These valves are arranged radially of the engine and in substantially central relation to the end walls thereof as shown in Fig. 9. However, I do not desire to be limited as to the location of the valves, that being determined in such a manner as to secure most effectively the objects of this invention. Any conventional form of valve may be used, the type shown herein being actuated for closing by a spring 33, suitable mechanism described hereinafter being used to open the valves. With the rotor rotating as shown by the arrow *a* the valve 31 acts as an intake valve while the valve 32 acts as an exhaust valve, while when the direction of rotation of the rotor is changed, the functions of the valves are interchanged, 31 then becoming the exhaust and 32 the intake valve.

Suitable means comprising cams or the like are provided to actuate the movable parts of the engine including the abutments and the various valves. Said means may be arranged in any desirable manner and driven directly by the main shaft 15 of the engine upon which they may be mounted. Such an arrangement possesses an important advantage particularly with regard to effective operation of the abutments. For this purpose positive motion cams 34 and 35 are provided which are keyed directly to the main shaft as at 36, and are mounted preferably at opposite ends of the shaft as shown in Fig. 2. The cam 34 faces the end 11 of the engine as shown in Fig. 4 so as to engage simultaneously the rollers 37 of the followers 38 to periodically rotate the crank arms 39 for actuation of the abutments 22 at 25 as aforesaid. A guide 40 or the like can be used in connection with the followers. At the other end of the engine shown in Fig. 8 is mounted the cam 35 which cooperates with suitable mechanism preferably of like kind with that described for the end 11 to actuate the crank arms 39ª for operation of the abutments 21 at 25ª. The cams 34 and 35 are so arranged as to provide for operation of the engine in one direction or in another, said cams being provided for this purpose with a multiple set of guides or grooves 41, which as shown communicate with each other. To insure therefore that the rollers will move in a proper direction when coming to a fork of the grooves, stop or closure means such as 42 and 43 are provided adapted to enter through openings 44 and 44ª in the respective cam plates 34 and 35 corresponding respectively to different directions of rotation of the rotor as aforesaid under actuation of a suitable lever mechanism comprising a plurality of links acting in conjunction with a type of clutch 45. This clutch includes a collar or sleeve 46 which is freely slidable upon the shaft for actuation by the fingers 47 of the fork 48 which may be pivotally mounted at 49 upon the back of the cam as shown in Fig. 5 and whereby the collar may be moved toward or away from said cam. It is to be understood that each cam is to be provided with a mechanism of the type described. The stop means 42 and 43 are then operated by the collars 46 with the aid of a bell crank 50 which likewise is pivotally mounted directly upon the cam as at 51 and connected to the collar by means of a link 52, said bell crank being constructed with a slip joint 50ª for ease of operation. This movement of the collar away from its cooperating cam will permit said stop means to be withdrawn from the grooves of the cam. With the engine running in the direction of arrow a the members 42 are inserted into the grooves of cam 34 while the members 43 are withdrawn from the grooves of cam 35, the position of these members being reversed when running the engine in opposite direction. Moreover since the pistons 18 contact the opening abutments 21 with a wiping action, stop means are rendered unnecessary at the forks 44ᵇ, since said contact precludes the possibility of an untimely closing of said abutments.

The intake and exhaust valves are operated by means shown generally in Figs. 8 and 9 and located wholly upon one end of the engine. This includes a link mechanism comprising a lever 53 pivoted at 53ª and actuated by links or connectors 54 to which they are hinged, said connectors comprising a portion slidably held within a guide 55, and having rollers 56 secured thereto to bear upon a cam wheel 57. The levers 53 are thus operative by the motion of said cam wheel to depress and open the valves against the force of the springs 33. Chiefly for structural reasons, the cam wheel 57 has been arranged to rotate at a speed one-fourth that of the main shaft. As will be understood from the description to be set forth hereinafter, an inlet or exhaust valve upon opening or closing remains opened or closed for 360° or for one full turn of the rotor, and it has therefore been found desirable in order to make a convenient and compact arrangement of the device, particularly in view of the necessity of using a gear mechanism to arrange the aforesaid 4 to 1 reduction. The cam wheel has four cams, each of which is subtended by an angle of 90°. Two cams 57ª and two cams 57ᵇ are respectively in alinement with each other, the cams 57ª being spaced axially from the cams 57ᵇ. Both a and b cams are likewise spaced 90° from each other. Thus the a cams will open the valves 31 for a complete turn of the rotor while the b cams will retain the valves 32 open for a complete rotation of the rotor. For this purpose the cam wheel 57 is shown as mounted rotatably as upon a circular shoulder 58 or the like formed upon an end of the engine and concentric with the axis thereof. Since the rim of the cam wheel is wider than said shoulder, a portion thereof projects beyond the face of the shoulder so that internal teeth 59 may be constructed thereon to form an annular gear. Gears 60, 61, and 62 are mounted upon the shoulder at the face thereof so as to lie within said annular gear and to be actuated in turn by the gear 64 which is keyed to the main shaft. It will thus be seen that while the gear 61 is proportioned to rotate at substantially twice the speed of the gear 64, the gear 60 will rotate at a speed approximately equal to that of 64, so that the annular gear in turn will rotate at one-fourth the speed of the shaft.

Auxiliary by-pass means 65 and 66 comprising the ports 67 and 68 and a valve 69 automatically operated by air pressure as against a spring 70 or the like are arranged within the end walls of the engine and adjacent to the abutments. The purpose of these by-pass arrangements will be indicated in course of describing the operation of the engine. For the sake of securing proper structural clearances the by-pass means 65 are located at one end of the engine while 66 are located upon the opposite end and staggered to the cranks 39 and 39ª. The port 67 is arranged to lie within the chamber 23, while the port 68 lies outside thereof. It will be noted that the valve is arranged to permit the flow in one direction only of a fluid which may enter through the port 68 and pass out through the port 67. Thus it will be seen that while air may enter through the openings 71 in the valve to exert pressure upon the valve disk so as to displace the same from its seat, the spring 70 will promptly close said valve as soon as the pressure drops.

The by-pass valves 30 in the main by-pass structure are operative by the crank arms 72 bearing the rollers 73 which are cooperative with the cams 74 upon the cam wheel 34 to open said valves. A spring 75 serves to retain the valves in normally closed position.

In describing the operation of the engine reference is had particularly to Figs. 10 to 15 taken in conjunction with Fig. 1. It will be noted that there are in general four distinct steps in the operation of this engine, which follow each other in usual course, namely: intake, compression, combustion and expansion, and finally exhaust of the burnt gases. Also that various combinations may be made such as the following: a plurality of pistons may be used in connection with one mechanism A, or a plurality of mechanisms A may be used with a single piston, the mode of operation in each case varying while the essential principles of this invention remain the same, although the arrangement disclosed herein embodies the preferred form. It will be noted also that when a piston has advanced to compress air into a combustion chamber 23 that compressed air is by-passed through the by-pass passage 28 from that portion of the chamber adjacent the head or front face of the piston to the portion thereof adjacent the rear or tail face thereof so that the firing will occur where the expanding gases will be able to drive the piston ahead for the purpose of securing rotation of the rotor in the desired direction.

As shown in Fig. 10, the engine is in intaking position, the intake valves 31 being open while the exhaust valves 32 are closed, air being caused to enter the engine in any suitable manner, as by aspiration. The abutments 22 will be observed as being closed therefore while the abutments 21 are open so as to be out of the way of the pistons. The chambers 19 and 20 between the abutments 22 are now divided by the pistons into two compartments each, namely 19$^a$ and 19$^b$, and 20$^a$ and 20$^b$. While intaking is occurring within the $a$ compartments as aforesaid, compression is occurring within the $b$ compartments of air previously taken into the engine as will be seen later. As the piston advances the step shown in Fig. 1 is reached, which indicates the position of the engine when ready for firing in both chambers 23 simultaneously, the intermediate steps being described later, it being noted generally that both sets of abutments are closed in that position. The intake valves now close, and expansion of the burnt gases occurs in the chambers 19$^a$ and 20$^a$ as shown in Fig. 11, while the air which was taken into the chambers 19$^a$ and 20$^a$ in the previous phase is in this half turn being compressed in the chambers 19$^b$ and 20$^b$. At the end of this second half turn, the engine is again in the firing position shown in Fig. 1, the exhaust valves 32 having opened to permit the pistons to discharge the burnt gases of the first combustion therethrough as shown in Fig. 14 while advancing under the impulse of the gases which result from the second combustion. In the fourth half turn which completes the cycle, the pistons are shown (in Fig. 15) exhausting the burnt gases of the second combustion through the valves 32 while intaking air for the first combustion of the next succeeding cycle through the valves 31. One then comes back again to Fig. 10, in which the air taken into the chambers 19$^a$ and 20$^a$ in the previous cycle is now being compressed in chambers 19$^b$ and 20$^b$ preparatory to the first combustion, while air is being received through the valves 31 which is compressed within the next half turn shown in Fig 11 for the second combustion.

The intermediate steps or stages will now be described with reference particularly to Figs. 12 and 13 which indicate intervening steps between any two of the diagrammatic figures referred to hereinbefore, but have been inserted particularly to illustrate the movements of the abutments between the phases shown in Fig. 11 and in Fig. 14. These figures show certain actions or movements of the abutments, which being governed by the cams 34 and 35 are alike for each half turn of the four phases of the cycle. In these diagrams one piston is identified with a straight arrow whereby its operation may be followed to the exclusion of the other. Referring again to Fig. 11 which as already stated, shows the pistons 18 advancing under the influence of gases of the first combustion, in chambers 19$^a$ and 20$^a$ and compressing air in chambers 19$^b$ and 20$^b$ preparatory to the second firing, Fig. 12 shows Fig. 11 with the pistons further advanced, the abutments 22 being still closed while the abutments 21 are about to close. The air which is being compressed in the chambers 20$^b$ by the advancing piston exerts pressure within the valves 69 through the ports 68, thereby opening said valves and permitting air to flow into the firing chambers 23. This prevents too high a pressure from building up within the chambers 19$^b$ and 20$^b$ and thus hindering the opening of the abutments 22. A slight scavenging of the chambers 23 may occur if desired, as by permitting the abutments 21 to remain open momentarily while air flows into the chambers 23 through the valves aforesaid, and then the abutments 21 snap shut to prevent escape of air. The auxiliary by-pass 65 is alone used, the by-pass 66 being operative only when the engine is running in reverse direction, in which case the by-pass 65 will not be used. Fig. 13 shows the pistons as having passed the exhaust valves 32 which have opened up. The abutments 21 are now completely closed, while the abutments 22 have swung out of the path of the pistons to permit entry thereof into the chambers 23 into which the air which formerly occupied the chambers 19<sup>b</sup> and 20<sup>b</sup> is now being further compressed. After the pistons have advanced into the firing chambers, the abutments 22 will close behind them to shut out the burnt gases of the first combustion which occupy the chambers 19 and 20 from the firing chambers 23, while at the same time confining the compressed air therein. The engine appears then as shown in Fig. 1 ready for firing, the valve 30 having opened in the meantime to permit by-passing of the compressed air. It will be noted in this connection that the firing position is reached when the pistons are spaced more remotely from the abutments 22 than from the abutments 21, merely clearance space being maintained relatively to the latter abutments, in order that the maximum quantity of air will be available for combustion purposes. It will be noted likewise that the view shown in Fig. 1 occurs at each half turn, that is, four times for each cycle. After firing the abutments 21 swing open to permit the passage of the pistons under the expanding gases in the chambers 19<sup>a</sup> and 20<sup>a</sup> while the burnt gases of the first combustion are being exhausted.

The simplicity of this cycle will be observed particularly in that while a unique interengagement and co-operation of the pistons with each other and with the various abutments is secured, the operation of the engine is controlled by a pair of cams which are of simple construction and can be made of sufficient strength for any desired purpose. The positions of the abutments in Figs. 10, 11 and 14 and 15 are the same. Since power is generated at two points upon opposite sides of the shaft, the proper balancing of the engine is secured. It will be observed, also, that since power is generated in phases which differ by 180°, the turning moment upon the shaft is more uniform.

The precise action of the cams 34 and 35 will be seen by reference to Figs. 5 and 6. The positions of the rollers 37 as shown upon the end views of the engine are shown in their proper places in the grooves of the cam for the position of the abutments shown in Fig. 1. The path of the rollers is shown by the arrows in the cam grooves, the particular path followed being determined by the direction of rotation of the rotor. Cam 34 operates abutments 22, while cam 35 operates abutments 21, the views of the cams being readable directly with Fig. 1 when it is borne in mind that an inward movement of the rollers toward the axis of the engine will in every case serve to open the abutments while a movement in the reverse direction serves to close them. Thus, as shown by cam 34, the abutments 21 have just closed since the rollers have been received within the inclined grooves 76 of the rotating cam and are now in their outermost position in the grooves 77. Likewise the position of the rollers in the cam 35 indicates that the abutments 21 are now closed being in their outermost position in the grooves 78, said abutments being about to open as evidenced by the fact that the rollers are soon to be received within the inclined grooves 79 of the rotating cam. The path of the rollers upon cam 34 indicates at C that the abutments 22 are to remain open but for a very brief time, just long enough to admit the pistons into the chambers 23 and then to close behind said pistons immediately, said abutments being otherwise closed through each of the four phases of the cycle. On the other hand the path of the rollers on cam 35 which cooperates with the abutments 21 indicates that these abutments are to remain closed for a relatively long period of time during each of the four phases of the cycle as indicated at D by the length of the portions of the grooves 78 through which the rollers travel, said abutments being uniformly open during the remaining portions of the phases. The reasons for this will be evident since the abutments 21 must remain closed for a sufficient length of time to permit of compression of the air prior to firing, after which said abutments must open and remain open to permit the pistons to advance under impulse of the expanding gases.

I claim:

1. The combination of a plurality of communicating chambers through which a piston is adapted to pass, and closure means comprising a plurality of spaced abutments arranged to extend between said chambers for making an enclosure therebetween which constitutes a combustion chamber, said abutments being arranged for pivotal movement about lines transverse to said chambers at the points of closure and to swing out of the path of the piston, by-pass means being provided communicating with the end portions of said enclosure in proximity to said abutments to permit gases therein to be by-passed from the front of the piston to the rear thereof while the piston passes through said enclosure.

2. In a rotary engine, the combination with a stator and a rotor, of a piston borne by said rotor and extending to the wall of the stator, a plurality of communicating chambers being provided between the rotor and the stator through which said piston is arranged to pass, and closure means between said chambers comprising a plurality of spaced abutments arranged to extend between said chambers for making an enclosure therebetween, said abutments being arranged for pivotal movement about lines transverse to said chambers at the points of closure and to swing out of the path of the piston, said enclosure constituting a firing chamber extending between the rotor and the stator and by-pass means being provided whereby a gas can be passed from the front to the rear of the piston while the same is passing through said firing chamber.

3. In a rotary engine, the combination with a stator and a rotor, of a piston borne by said rotor and extending to the wall of the stator, and a plurality of abutments extending across the space between the rotor and the stator, said piston being arranged to compress a gas in a space between the rotor and the stator and against one of the abutments toward which the piston is moving, a second abutment being arranged in spaced relation to the first abutment and to close behind said piston when the same has reached a predetermined spaced position with respect to the first abutment, by-pass means being provided to pass the compressed gas from the front to the rear of the piston as the same continues moving toward the first abutment, the second abutment constituting an enclosure means for retaining the gases behind the piston for firing, the first abutment being arranged to swing out of the path of the piston to permit the same to continue traveling under impulse of the burning gases, said abutments being arranged for pivotal movement about lines parallel to the axis of the rotor to swing out of the path of the rotor and forming therebetween a compression and firing chamber.

In testimony whereof I affix my signature.

ARTHUR JAMES LA GASA.